US011176655B2

(12) United States Patent
Akopyan et al.

(10) Patent No.: US 11,176,655 B2
(45) Date of Patent: Nov. 16, 2021

(54) SYSTEM AND METHOD FOR DETERMINING 3D SURFACE FEATURES AND IRREGULARITIES ON AN OBJECT

(71) Applicant: Cognex Corporation, Natick, MA (US)

(72) Inventors: Mikhail Akopyan, Sudbury, MA (US); Lowell D. Jacobson, Grafton, MA (US); Robert A. Wolff, Sherborn, MA (US)

(73) Assignee: Cognex Corporation, Natick, MA (US)

( * ) Notice: Subject to any disclaimer, the term of this patent is extended or adjusted under 35 U.S.C. 154(b) by 91 days.

(21) Appl. No.: 14/329,752

(22) Filed: Jul. 11, 2014

(65) Prior Publication Data

US 2015/0213606 A1 Jul. 30, 2015

Related U.S. Application Data

(60) Provisional application No. 61/932,221, filed on Jan. 27, 2014.

(51) Int. Cl.
*G06T 7/44* (2017.01)
*G06T 7/00* (2017.01)
(Continued)

(52) U.S. Cl.
CPC ........ *G06T 7/0004* (2013.01); *G01B 11/0608* (2013.01); *G01S 7/4802* (2013.01);
(Continued)

(58) Field of Classification Search
CPC .......................... G01B 11/0608; G01B 21/045
See application file for complete search history.

(56) References Cited

U.S. PATENT DOCUMENTS

| 5,495,537 A | 2/1996 | Bedrosian et al. |
| 5,818,953 A * | 10/1998 | Queisser ................ G01N 21/88 209/580 |

(Continued)

FOREIGN PATENT DOCUMENTS

| CN | 102853786 A | 1/2013 |
| CN | 103049906 A | 4/2013 |

(Continued)

OTHER PUBLICATIONS

Necas, et al., "Gwyddion: An Open-Source Software for SPM Data Analysis", "Central European Journal of Physics", Feb. 1, 2012, pp. 181-188, vol. 10, No. 1, Publisher: Springer, Published in: EP.

(Continued)

*Primary Examiner* — Helen Shibru
(74) *Attorney, Agent, or Firm* — Loginov & Associates, PLLC; William A. Loginov

(57) ABSTRACT

This invention provides a system and method for determining the location and characteristics of certain surface features that comprises elevated or depressed regions with respect to a smooth surrounding surface on an object. A filter acts on a range image of the scene. A filter defines an annulus or other perimeter shape around each pixel in which a best-fit surface is established. A normal to the pixel allows derivation of local displacement height. The displacement height is used to establish a height deviation image of the object, with which bumps, dents or other height-displacement features can be determined. The bump filter can be used to locate regions on a surface with minimal irregularities by mapping such irregularities to a grid and then thresholding the grid to generate a cost function. Regions with a minimal cost are acceptable candidates for application of labels and other items in which a smooth surface is desirable.

11 Claims, 12 Drawing Sheets

(51) Int. Cl.
  *G01S 17/42* (2006.01)
  *G01S 17/48* (2006.01)
  *G01B 11/06* (2006.01)
  *G01S 7/48* (2006.01)
  *G01S 17/89* (2020.01)
(52) U.S. Cl.
  CPC .............. *G01S 17/42* (2013.01); *G01S 17/48* (2013.01); *G01S 17/89* (2013.01); *G06T 7/44* (2017.01); *G06T 2207/10028* (2013.01); *G06T 2207/30224* (2013.01)

(56) References Cited

U.S. PATENT DOCUMENTS

| | | | |
|---|---|---|---|
| 6,064,759 | A | 5/2000 | Buckley et al. |
| 6,144,453 | A * | 11/2000 | Hallerman ............. G01N 21/88 |
| | | | 356/616 |
| 6,173,066 | B1 | 1/2001 | Peurach et al. |
| 6,323,776 | B1 | 11/2001 | Jackson et al. |
| 6,847,728 | B2 | 1/2005 | Tao et al. |
| 7,015,418 | B2 | 3/2006 | Cahill et al. |
| 7,119,351 | B2 | 10/2006 | Woelki |
| 7,187,797 | B2 | 3/2007 | Sones |
| 7,583,372 | B2 | 9/2009 | Shylanski et al. |
| 8,311,311 | B2 | 11/2012 | Bryll et al. |
| 2005/0140670 | A1* | 6/2005 | Wu ........................ G06T 17/20 |
| | | | 345/419 |
| 2006/0289751 | A1* | 12/2006 | Watanabe ............ G01R 31/307 |
| | | | 250/310 |
| 2009/0169096 | A1* | 7/2009 | Cipolla ................... G06T 7/557 |
| | | | 382/154 |
| 2010/0104168 | A1* | 4/2010 | Dobbe ...................... G06T 7/60 |
| | | | 382/134 |
| 2010/0194867 | A1* | 8/2010 | Bergman ............... G03B 21/00 |
| | | | 348/54 |
| 2013/0202727 | A1 | 8/2013 | Kitazawa et al. |
| 2014/0118716 | A1* | 5/2014 | Kaganovich ........... G01S 17/89 |
| | | | 356/4.01 |

FOREIGN PATENT DOCUMENTS

| | | |
|---|---|---|
| CN | 103473743 A | 12/2013 |
| WO | 2008074088 A1 | 6/2008 |

OTHER PUBLICATIONS

Klapetek, et al., "Methods for Determining and Processing 3D Errors and Uncertainties for AFM Data Analysis", "Measurement Science and Technology", Jan. 11, 2011, pp. 1-10, vol. 22, No. 2, Publisher: IOP Publishing, Published in: US.

Badea, D. and Jacobsen, K.: "Filtering the LiDAR Data", In: RevCAD, Journal of Geodesy and Cadastre, 2012, No. 13, S. 5-17. ISSN: 1583-2279.

* cited by examiner

SYSTEM AND METHOD FOR DETERMINING 3D SURFACE FEATURES AND IRREGULARITIES ON AN OBJECT

FIELD OF THE INVENTION

This invention relates to machine vision systems used in determining the displacement of an imaged object surface in three dimensions (3D).

BACKGROUND OF THE INVENTION

In manufacturing and assembly processes, it is often desirable to analyze an object surface to determine the nature of features and/or irregularities. The displacement (or "profile") of the object surface can be determined using a machine vision system (also termed herein "vision system") in the form of a laser displacement sensor (also termed a laser beam "profiler"). A laser displacement sensor captures and determines the (three dimensional) profile of a scanned object surface using a planar curtain or "fan" of a laser beam at a particular plane transverse to the beam propagation path. In a conventional arrangement, a vision system camera assembly is oriented to view the plane of the beam from outside the plane. This arrangement captures the profile of the projected line (e.g. extending along the physical x-axis) on the object surface, which, due to the baseline (i.e. the relative spacing along the y-axis) between the beam (fan) plane and the camera causes the imaged line to appear as varying in the image y-axis direction as a function of the physical z-axis height of the imaged point (along the image x-axis). This deviation represents the profile of the surface. Laser displacement sensors are useful in a wide range of inspection and manufacturing operations where the user desires to measure and characterize surface details of a scanned object via triangulation. One form of laser displacement sensor uses a vision system camera having a lens assembly and image sensor (or "imager") that can be based upon a CCD or CMOS design. The imager defines a predetermined field of grayscale or color-sensing pixels on an image plane that receives focused light from an imaged scene through a lens.

In a typical arrangement, the displacement sensor and/or object are in relative motion (usually in the physical y-coordinate direction) so that the object surface is scanned by the camera, and a sequence of images are acquired of the laser line at desired spatial intervals—typically in association with an encoder or other motion measurement device (or, alternatively, at time based intervals). Each of these single profile lines is typically derived from a single acquired image. These lines collectively describe the surface of the imaged object and surrounding imaged scene and define a "range image" or "depth image".

Other camera assemblies can also be employed to capture a 3D image (range image) of an object in a scene. For example, structured light systems, stereo vision systems, DLP metrology, and other arrangements can be employed. These systems all generate an image that provides a height value (e.g. z-coordinate) to pixels.

A 3D (range) image generated by various types of camera assemblies (or combinations thereof) can be used to locate and determine the presence and/or characteristics of particular features on the object surface. A challenge is for a vision system to identify and localize such features, particularly where the surface, itself defines a varying surface profile. A further challenge is to locate regions of an object that are suitable for placement of certain items, and application of certain processes—such as labels and/or printing—where 3D surface irregularities can compromise satisfactory placement.

SUMMARY OF THE INVENTION

This invention overcomes disadvantages of the prior art by providing a system and method for determining the location and relative characteristics of certain 3D surface features that generally comprises elevated or depressed regions with respect to a smooth surrounding local surface on an overall object. The system and method employs a filter that acts on a range (depth) image of the scene (including the object). A filter can define an annulus or other appropriate perimeter shape around each pixel in which a best-fit surface (e.g. a best-fit plane) is established therefrom. The best-fit surface is used to generate a normal at the pixel. The normal is used to derive a local displacement height with respect to an average height of the best-fit plane. The displacement height is used to establish an overall "bump" or "height deviation" image of the object, with which bumps, dents or other height-displacement/deviation features can be localized and analyzed using appropriate vision system tools (e.g. blob tools, edge tools, caliper tools, etc.).

In an illustrative embodiment, a system for determining surface normal height variations (features) on an object based upon a range image is provided. A camera assembly generates a range image of the scene containing the object. A vision system operatively connected to, and/or associated with the camera assembly analyzes the range image. A filter, running a filtering process that is associated with a camera sensor process, or that receives images from a source after acquisition thereof, and that (a) generates a best-fit surface (for example, a best-fit plane) of average height about each of selected pixels in the range image, (b) establishes a normal to the best-fit surface, respectively for each of the pixels, and (c) determines a relative height displacement of a region about each of the pixels relative to the best-fit surface. A vision system tool associated with the sensor process analyzes height displaced features localized by the filter. Illustratively, the filter includes a background region about each of the selected pixels from which the best-fit surface is established. The filter illustratively includes a foreground region, located within proximate to the background region. Within the foreground region the process determines relative height displacement for at least one of the selected pixels. In an illustrative embodiment, at least one of a size and a shape of at least one of the background region and the foreground region is user-defined based upon at least one of a size and a shape of the object. Also illustratively, the camera assembly comprises a displacement sensor that projects a line of light on the object and receives light from the projected line at an imager in a manner that defines a plurality of displacement values in a height direction (e.g. a laser displacement sensor).

In another illustrative embodiment, a system and method for determining regions of surface irregularity is provided. This system and method can be used to locate regions on an object surface that are sufficiently irregularity-free to enable satisfactory placement/application of labels, printing or other items and enhancements. The system and method employs the above-described bump filter to locate regions on a surface with minimal irregularities by mapping such irregularities to a grid and then thresholding the grid to generate a cost function. Regions with a minimal cost are acceptable candidates for application of labels and other items in which a smooth surface is desirable. In an illustrative embodiment, a system and method for determining a region on a surface having low surface irregularity is provided. The system and method employs a vision system tool that locates the surface and acquires a 3D image of at least a portion of the surface. A (bump) filter determines a relative height displacement for an area about each of a selected group of pixels on the 3D image. In illustrative embodiments, a mapping element can resolve the height displacement for each of a plurality of regions on the image into a grid element with a height value. This height value can be thresholded (e.g. into binary 1 and 0 values). A location element then cost-values the height displacement for each region and determines a minimal cost region that accommodates a predetermined area based directly on results provided by the bump filter or based upon a thresholded result. The thresholded result can be part of a mapped grid. This predetermined area, if it exists, can be sized to accommodate a label, printing or other embellishment. A thresholding element resolves each respective height value into a binary value based upon whether a height value is above or below at least one predetermined parameter. The predetermined parameter is at least one of (a) height displacement above or below a surrounding surface in the region and (b) area of a differing height displacement relative to the surrounding surface in the region. Illustratively, the location element determines if a suitable minimal cost region exists. Additionally, each grid element can comprise part of a regular grid of predetermined density on the image and/or the image can include at least one exclusionary zone thereon that is omitted from the minimal cost region. This exclusionary zone can include at least one of a label, printing and an embellishment on the surface. The surface can comprise at least part of a package, and the minimal cost region is adapted to receive at least one of an applied label and printing.

BRIEF DESCRIPTION OF THE DRAWINGS

The invention description below refers to the accompanying drawings, of which.

DETAILED DESCRIPTION

I. System Overview

Figure 1:
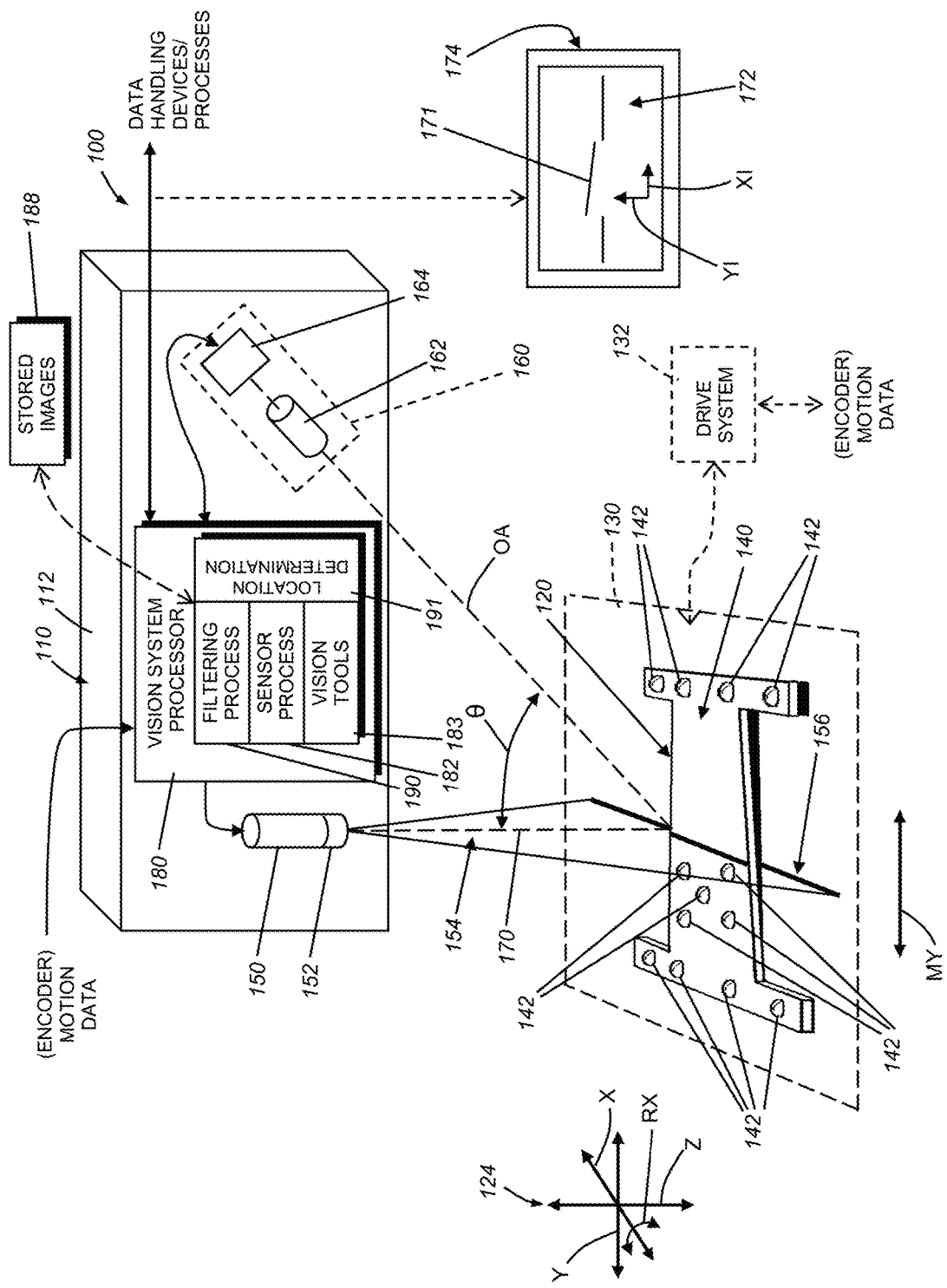
FIG. 1 is a schematic perspective view of a laser displacement sensor system acquiring an image of an object having surface normal bump/nub features requiring analysis, as relative motion occurs therebetween in a scanning direction according to an illustrative embodiment.

FIG. 1 shows a vision system arrangement 100 including a laser displacement sensor assembly 110 oriented to image an object 120 (also sometimes referred to as a "part"). The displacement sensor assembly (or, simply "displacement sensor") can be contained in a single housing 112 that is mounted at an appropriate location with respect to the imaged scene. In alternate embodiments, the displacement sensor can comprise discrete, separated subcomponents. The object 120 and the displacement sensor 110 are in relative motion (double arrow MY) with either the displacement sensor 110, the object 120, or both, moving (the scan motion direction) along at least one axis of the relative coordinate system 124 (in this example, the physical y-axis direction). In a typical arrangement, the object 120 is located on a precision motion stage 130 (shown in phantom) that provides motion data from an encoder or similar device operatively connected to the motion stage drive system 132 in a manner clear to those of skill in the art.

Note that the above-described displacement sensor 110 is one of a variety of imaging devices and/or camera assemblies that can be used to generate a range image for use in accordance with the system and method herein. By way of non-limiting example, a camera assembly as defined herein can include a structured light system, a stereo vision system, DLP metrology and/or combinations thereof, among other types of arrangements. Also, as described further below, the system and method can be employed on images that are acquired and then stored for further processing. Such images can be transmitted for processing by the system and method (i.e. a filtering process and associated vision system tools) in a manner in which the processor is free of connection to the camera assembly or other image acquisition arrangement.

The object 120 is, by way of example, a structure having a surface 140 that defines a generally non-planar shape, and by way of non-limiting example, more particularly defines a somewhat twisted surface in which the height (i.e. the displacement dimension along the physical z axis) varies with respect to the x-axis and y-axis directions. Notably, the object surface 140 includes a plurality of bumps or "nubs" 142 that each vary in displacement along the physical z-axis direction—typically being directed in a "positive" direction away from the object surface. The positive displacement can be characterized as residing along a direction and distance that is normal to the object surface (i.e. surface-normal to a plane that is tangent to the surface at a point on the nub). These nubs 142, thus define a height displacement with respect to the surrounding surface. This is only one example of a wide range of possible surface shapes, and is described as a useful example of the principles of the illustrative embodiment of the system and method. In further examples the outer, surrounding surface can define a more complex perimeter with additional features.

The displacement sensor assembly 110 includes a laser assembly 150 that includes a lens or other optical arrangement 152 (e.g. a Powell lens or a cylindrical lens) that projects a curtain or fan 154 of laser light, toward the object 120 in a manner that forms a line 156 along the physical x-axis (transverse to the scan motion direction MY). The fan 154 resides generally in a plane that, in this embodiment, is approximately (or substantially) perpendicular to a reference plane, such as the physical x-y plane of the motion stage 130 and/or a plane of the surrounding object surface 140. The displacement sensor 110 also includes a camera assembly (dashed box 160) consisting generally of a lens/optics assembly 162 potentially arranged in a well-known Scheimpflug configuration and an imager assembly ("imager") 164. The imager 164 contains an array of photosensitive pixels at a predetermined resolution, and the camera assembly generally defines an optical axis OA that intersects the object 120 in the region of the line 156. The optical axis OA defines a non-parallel (e.g. acute) angle θ with respect to the plane (and associated line 170) of the laser fan 154. Thus, any physical z-axis height variation/displacement in the line along the physical x-axis is imaged by the camera assembly 160 as a variation in position (along the image axis YI) in the resulting line 171 of a two-dimensional (2D) image 172 as shown generally in the exemplary (and optional) display 174.

Note that the arrangement of axes (x, y, z) is a convention and other representations of relative orientation (e.g. polar coordinates) are expressly contemplated. As shown, rotation about a given axis is also represented, for example by the double-curved arrow Rx, which depicts rotation about the physical x-axis.

The imager 164 is operatively interconnected to a vision system processor 180 that is contained within the housing 112 of the displacement sensor 110 in this embodiment. In alternate embodiments, some or all of the vision system processor components and/or processes can reside remote from the housing (on an interconnected PC, for example). The vision system processor 180 performs a displacement sensor process 182 in accordance with the illustrative embodiment described in detail further below. The processor 180 also receives relative motion signals from the motion stage 130 or another moving device (e.g. a gantry or manipulator holding the displacement sensor and/or the object). Images are acquired in association with such motion signals so that the line 156 is registered with the physical position in the scene.

As also described below, the image data (i.e. a 2D range image) for the object is transmitted to downstream data handling devices and processes for use in various production activities, such as inspection, quality control, object manipulation, assembly, etc.

Users typically desire measurements characterized in physical units (e.g., millimeters or microns in x and y and z), rather than image units (i.e. pixels/pels in x, encoder motion-based triggers in y, and row displacements in z). For this reason, displacement sensors are typically calibrated to convert between image pixel outputs and physical units, such that the calibrated displacement sensor output is in physical units. Displacement sensor calibration can be performed by the manufacturer such that the displacement sensor provides output in physical units (such as the model DS1100 available from Cognex Corporation of Natick, Mass.). Alternatively, sensors can provide output in uncalibrated image units. When the sensor output is in uncalibrated image units, the user or application is tasked with handling input data in image pixel units.

Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software.

II. Filter and Sensor Process

Figure 2:
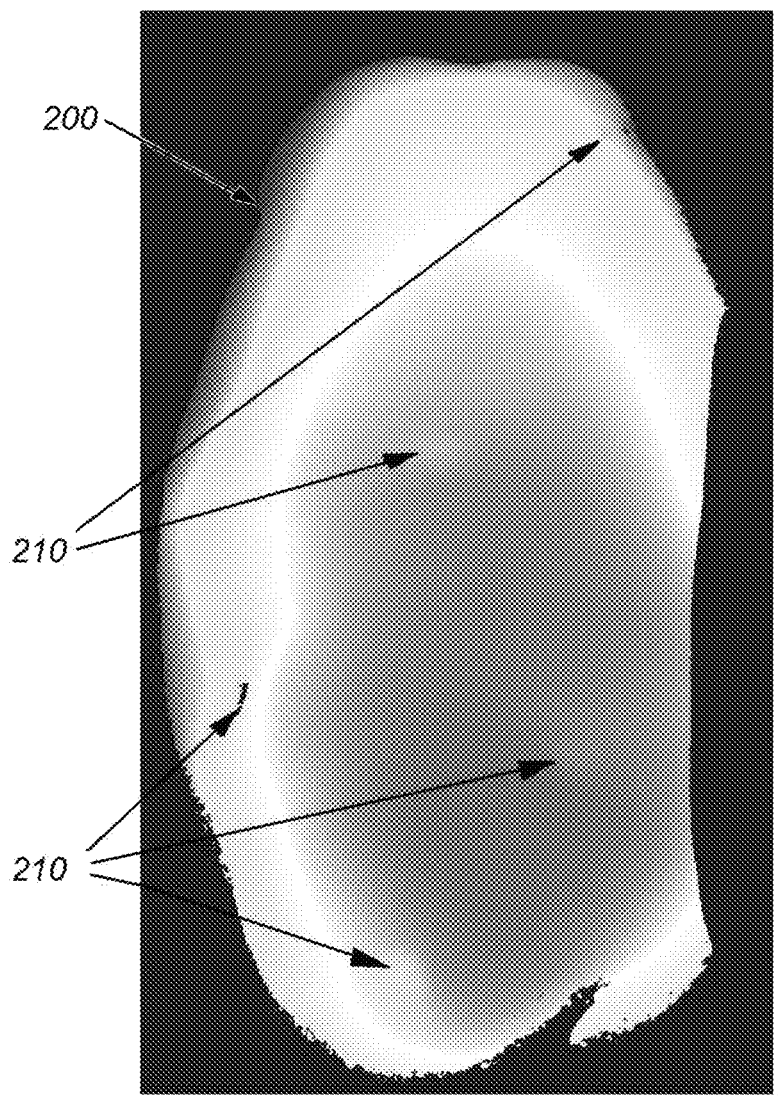
FIG. 2 is a diagram of a range image of an exemplary object (e.g. a potato) having a non-planar surface and a plurality of bump/height deviation features, illustrating the difficulty of resolving such features from an unfiltered image.

Reference is made briefly to FIG. 2, which shows a range image 200 of an object, which in this example is a potato with a varying surface geometry and a variety of height deviating/height-displaced features 210. These height-displaced features 210 ("bumps" or "nubs" are imaged and appear in a differing shade and/or color. However, it should be clear that such "bumps" are difficult to resolve due to the overall variation in surface height/geometry for the object. The geometry of the object surface (e.g. a twisted shape) renders identification of individual nubs (or other surface-normal height varying features—such as dents) difficult to identify. This can slow or render ineffective the overall inspection process using a vision system. Therefore, in order to enhance the effectiveness and accuracy of the vision system's inspection process, a filtering process 190 (FIG. 1) in accordance with an illustrative embodiment is applied as part of the overall sensor process 182. The filtered image is described further below with reference to FIG. 9.

As shown in FIG. 1, images can alternatively (or additionally) be provided from a source 188 that stores image data for further processing. The image processor that includes the filtering process 190 and/or vision system tools 183 can be separate from the camera assembly's functions and can be located in a separate device, or can reside within the camera assembly (110) as shown. Thus, it is expressly contemplated that the system and method can operate on images free of interconnection with the camera assembly at the time filtering processes are performed.

Figure 3:
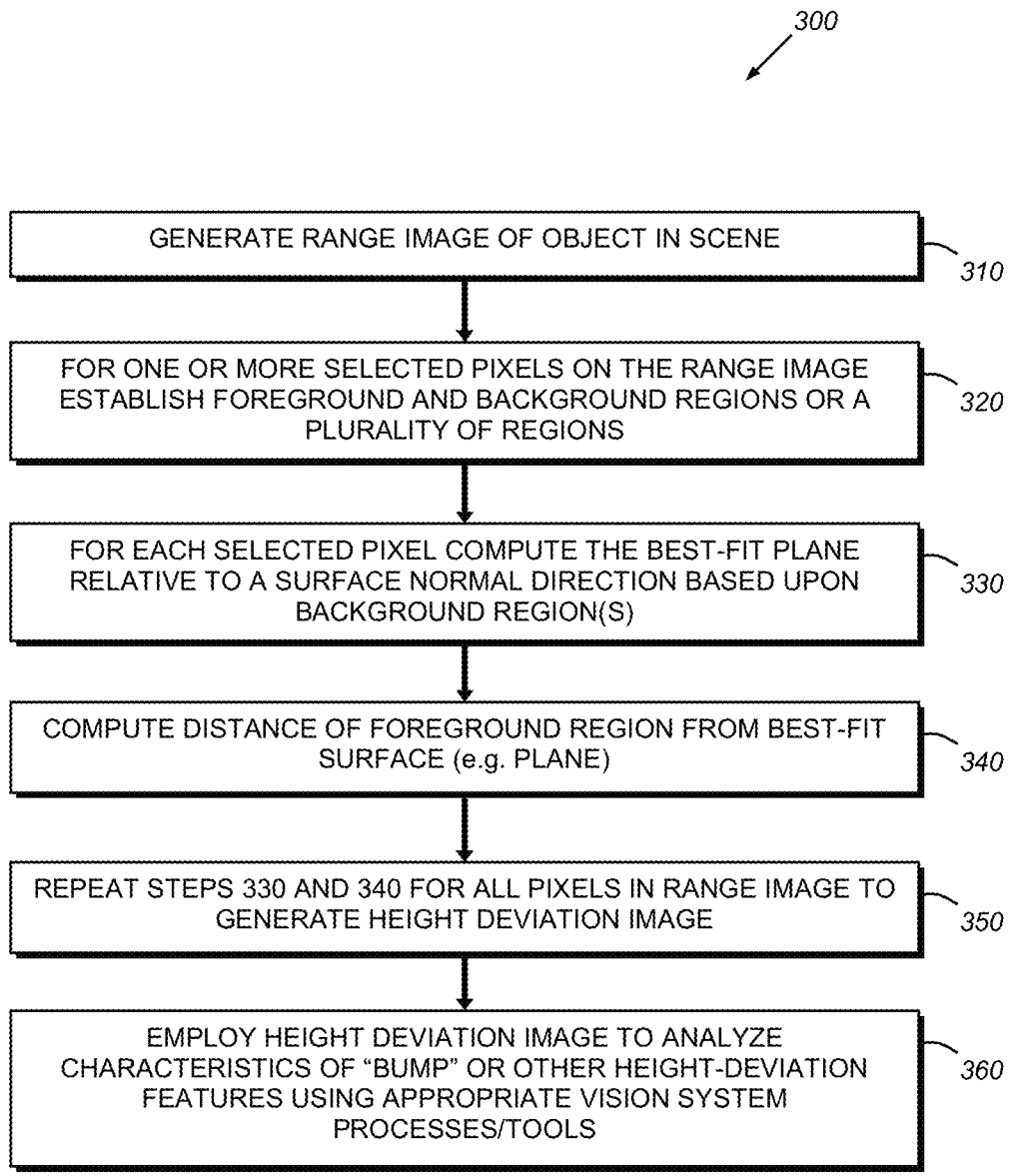
FIG. 3 is a flow diagram of a filtering process for resolving height-displaced, surface height variations, such as bumps and dents according to an illustrative embodiment.
Figure 4:
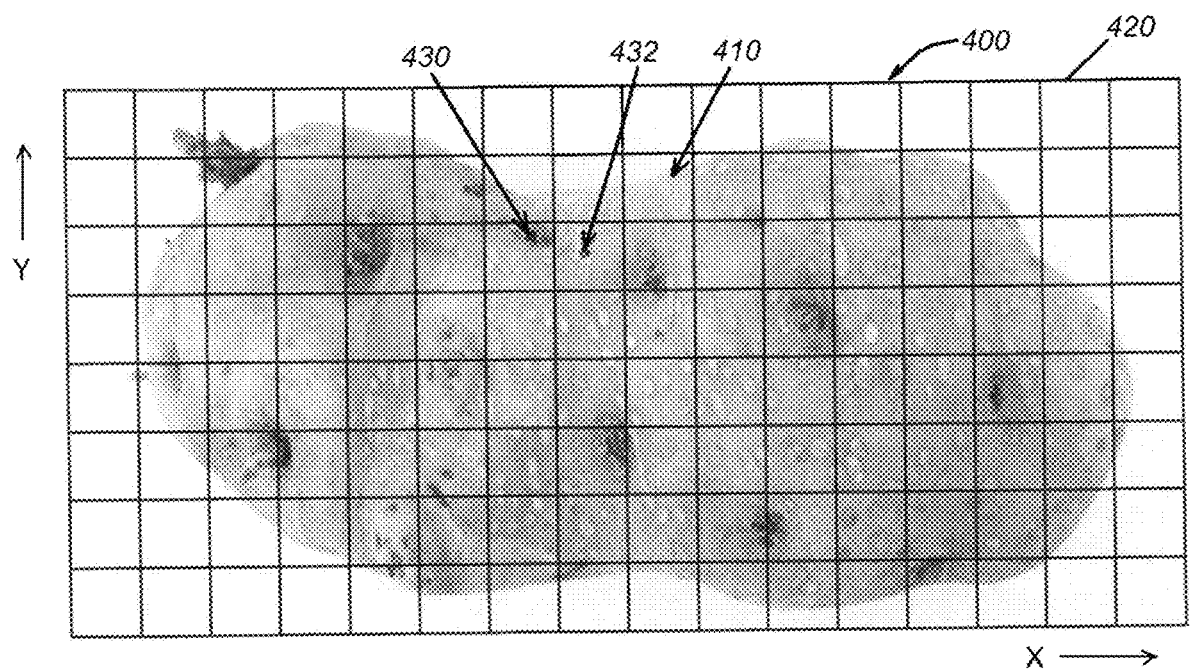
FIG. 4 is a diagram of a range image of an exemplary object (e.g. a potato) that contains a varying surface with bumps and dents (i.e. height deviation features), showing its relation to a base plane (a grid) for use in describing the illustrative filtering process of FIG. 3.

The filtering process 190 is described with further reference to the flow diagram of FIG. 3. The process begins when an object within the scene is imaged to generate a range image (step 310). With reference also to FIG. 4, a range image 400 exemplary object 410 having a variable surface geometry (e.g. a potato) is shown. The depicted exemplary object surface defines a plurality of positive-height features (e.g. bumps or nubs) and a plurality of negative-height features (e.g. dents). The range image processed by the illustrative filter defines a range (z-axis depth) image of the object (potato), wherein each image pixel represents the height (e.g., in mm) of the object above a base plane (exemplary grid 420 and surface 130 (FIG. 1)) on which the object rests. The coordinates of two exemplary z pixels 430, 432 can be represented as $Z_0(X_0, Y_0)$ and $Z_1(X1, Y1)$, respectively. The full range image defines the height z at each pixel location (xi, yj) of the image.

Figure 5:
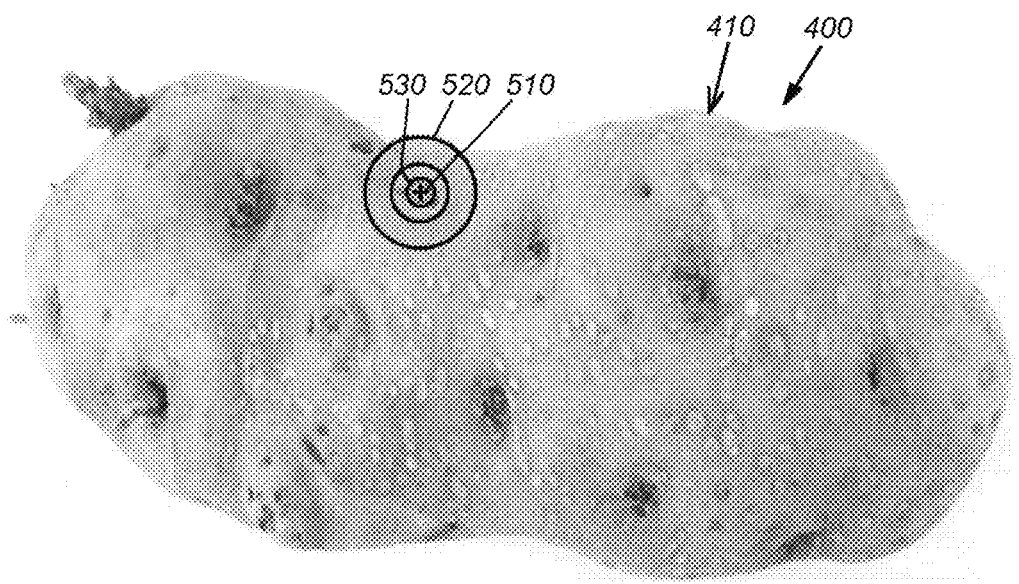
FIG. 5 is a further diagram of the exemplary range image of FIG. 4 describing the establishment of foreground and background regions in accordance with the illustrative filtering process of FIG. 3.

In step 320, the filtering process 190 first generates a surface height and a surface normal direction (using a plane-fit tool). The process 190 then computes a height deviation measurement in the normal direction (using a height tool). The plane fit creates the first two measurements and the height tool creates the third measurement. Referring also to the image 400 of FIG. 5, the process 190 computes an appropriate foreground region and background region (or plurality of such regions) for each pixel (cross 510). The exemplary pixel (cross 510) is shown with a background region (annulus 520) centered around it at a radial distance from a foreground surface (circle 530), which represents the normal height region. The bump height can be computed from each pixel in the image or a subset of pixel that can be determined by various processes. Note that a plurality of background and/or foreground regions can be established for a given pixel. The two regions are used to compute the local "bump" height of the pixel (cross 510) as described further below. The size, shape and number of such regions can be determined by the user via an appropriate user interface (for example an interface associated with display 174 in FIG. 1). These regions can be established based upon general knowledge about the size, shape and/or location of the bumps (or other surface normal height features) on the object. In this manner, the user sets the parameters of the filter so as to optimize determination of such features on the object.

The process 190 next generates (for each of one or more (a plurality) of regions (e.g. pixel 510)) in the image 400 a best-fit surface and surface normal for z pixels in that region (step 330). Note that the best-fit surface is typically a plane, but it is expressly contemplated that the best-fit surface can comprise all or a portion of a sphere, or other predefined 2D or 3D shape. Such shape is selected and defined, potentially by a user input, to provide the best results for a particular height deviation feature. The illustrative best-fit surface/plane 610 is generated from the background region (annulus 520), and represents a local background estimate of the "smooth" object surface in the area of the pixel 510 based upon a height profile for pixels in the background region. The surface normal 620 extends from the pixel 510 and is perpendicular to the illustrative plane 610, pointing in a positive height direction. Note that the regions used to generate the best-fit surface and/or the bump height (background and foreground) need not be contiguous when pluralities of such regions are employed. This can allow the system to omit certain features that fall outside the "smooth" or "bump" geometry that characterizes the rest of the surface on the object.

Figure 6:
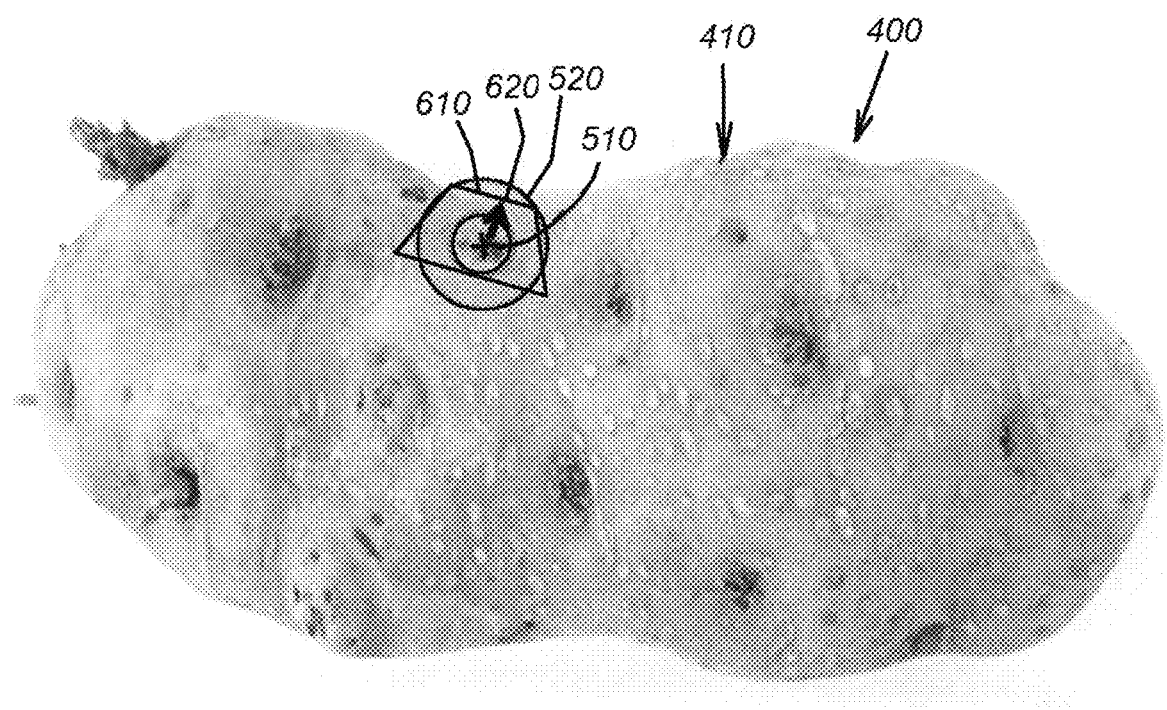
FIG. 6 is a further diagram of the exemplary range image of FIG. 4 describing the generation of a best-fit surface (e.g. a best-fit plane) around a selected pixel in accordance with the illustrative filtering process of FIG. 3.
Figure 7:
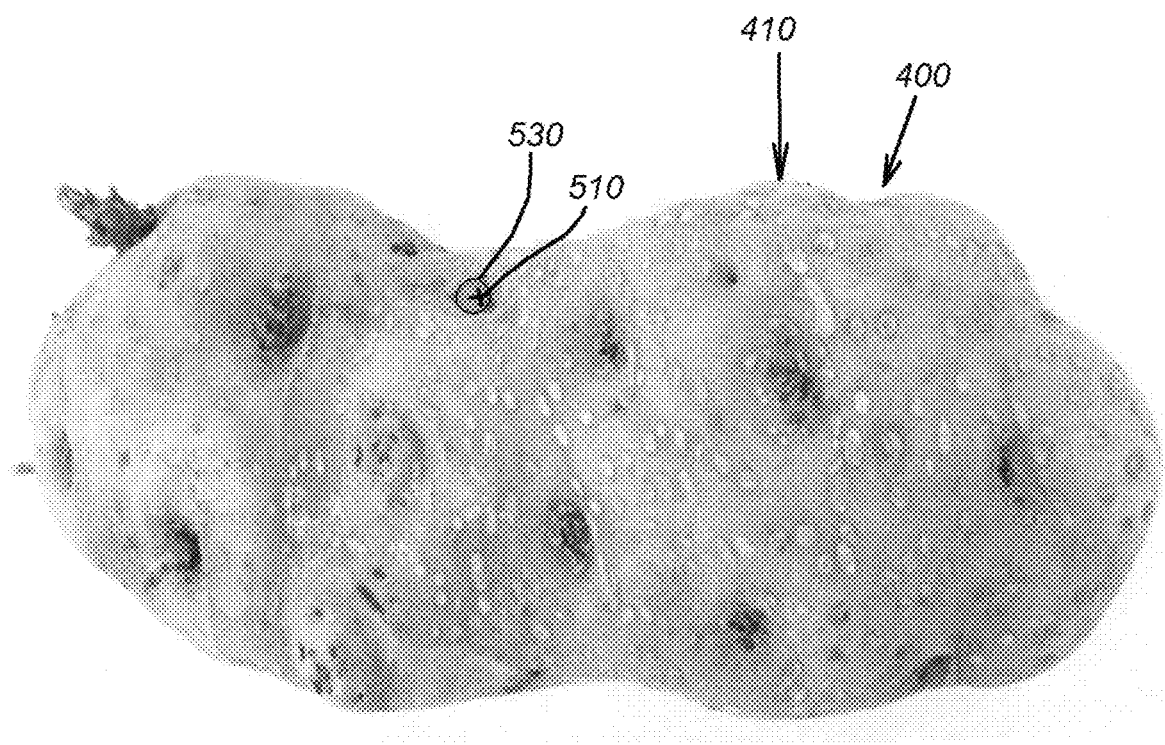
FIG. 7 is a further diagram of the exemplary range image of FIG. 4 describing the generation of a distance in the normal direction with respect to a selected pixel in accordance with the illustrative filtering process of FIG. 3.

In step 340, and with reference to FIG. 7, the process 190 then computes the relative distance of the foreground region 530 for the pixel 510 from the best-fit plane 610 (FIG. 6). The foreground region 530 defines the set of z pixels whose average, signed distance is computed from the estimated local background plane 610. Note that the underlying base plane (420, FIG. 4) can be computed in a variety of ways. The position of the scan line in the field of view in portions of the imaged scene that represent a minimum height can be associated with a base plane (z-axis) height. This average distance can optionally be obtained by computing the center of mass (CM) of the foreground points and then computing the (signed) distance of this CM point to the estimated local background surface/plane. Note that the distance is signed positive if the foreground region is above the surface/plane 610 (on the same side of the plane as the outward surface normal shown in the previous slide), and signed negative if it is below the plane 610.

Figure 8:
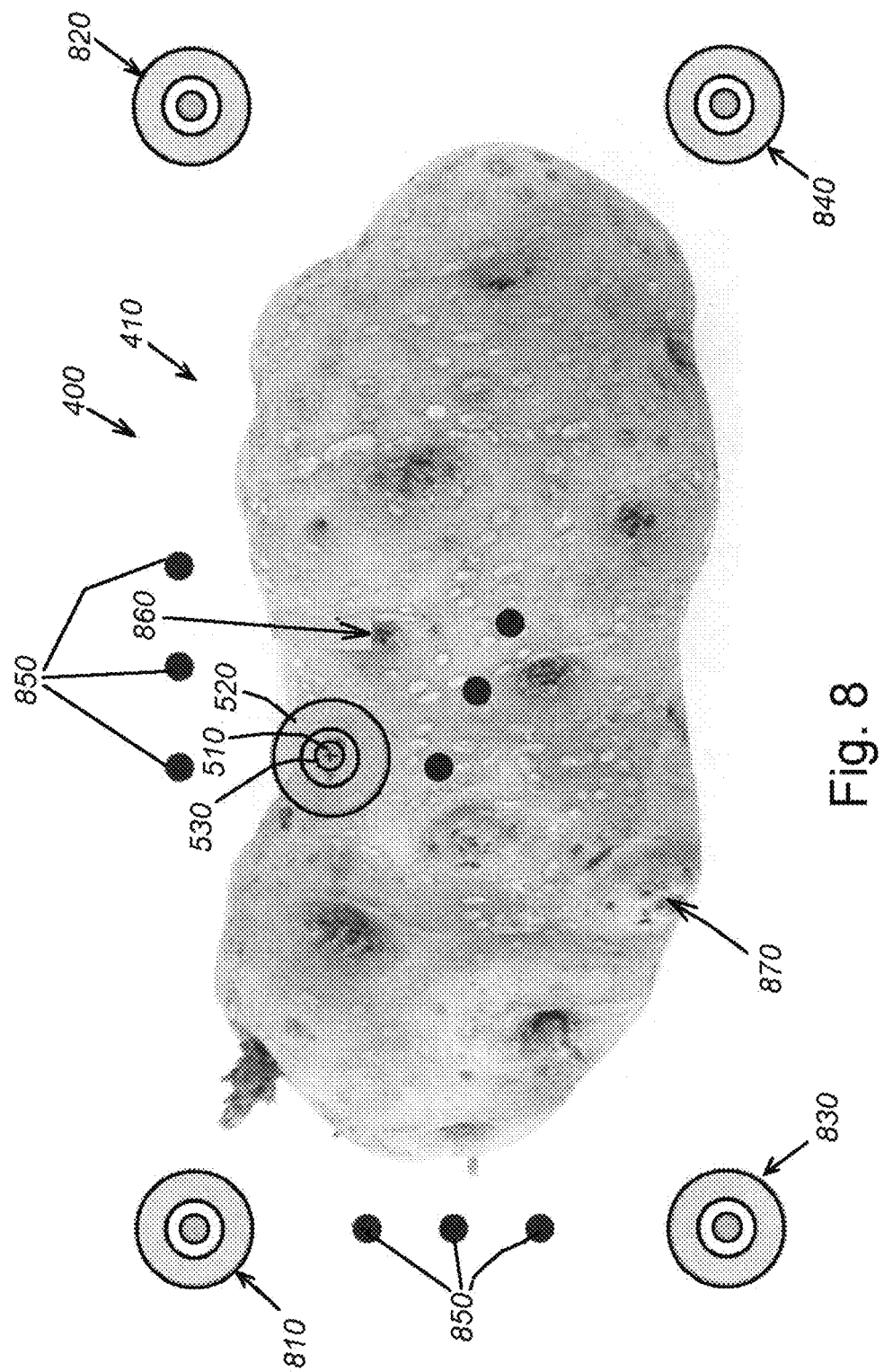
FIG. 8 is a further diagram of the exemplary range image of FIG. 4 describing the application of the filter operator to all pixels in the range image in accordance with the illustrative filtering process of FIG. 3 to generate an overall height deviation image

In step 350, and with reference to FIG. 8, the image 400 is analyzed at each pixel using the filter operator described above (with one or more background regions and one or more foreground regions per pixel), to generate an overall "bump image", or more generally a "height deviation image" result. That is, the process repeats steps 330 and 340 above for all (or a selected subset of all) pixels in the range image. The filter operator 810, 820, 830, and 840 is shown at various locations around the image 400. Note that negative-height "dents" can also be analyzed as well as positive-height "bumps" 870. Areas on the base plane (420 in FIG. 4) are shown as spots 850. The resulting height deviation image is a signed image that represents the local height deviations from a smoothed surface representation of the object (e.g. a potato). Local dents (e.g. dent 860) in the surface define negative heights and local bumps (e.g. bump 870) on the surface define positive heights, relative to the local surrounding surface.

Based upon the height deviation "bump" image derived in step 350, the sensor process can apply various vision system tools (183 in FIG. 1) including, but not limited to, edge-detection tools, blob analysis tools and/or caliper tools to analyze such bump, dent or other features for conformance with desired specifications (step 360). Desirably, such bumps and dents are localized by the filter so that the vision system can direct analysis to these features more efficiently and with reduced processing time.

IV. Determination of Irregularity-Free Regions on an Object Surface

Figure 10:
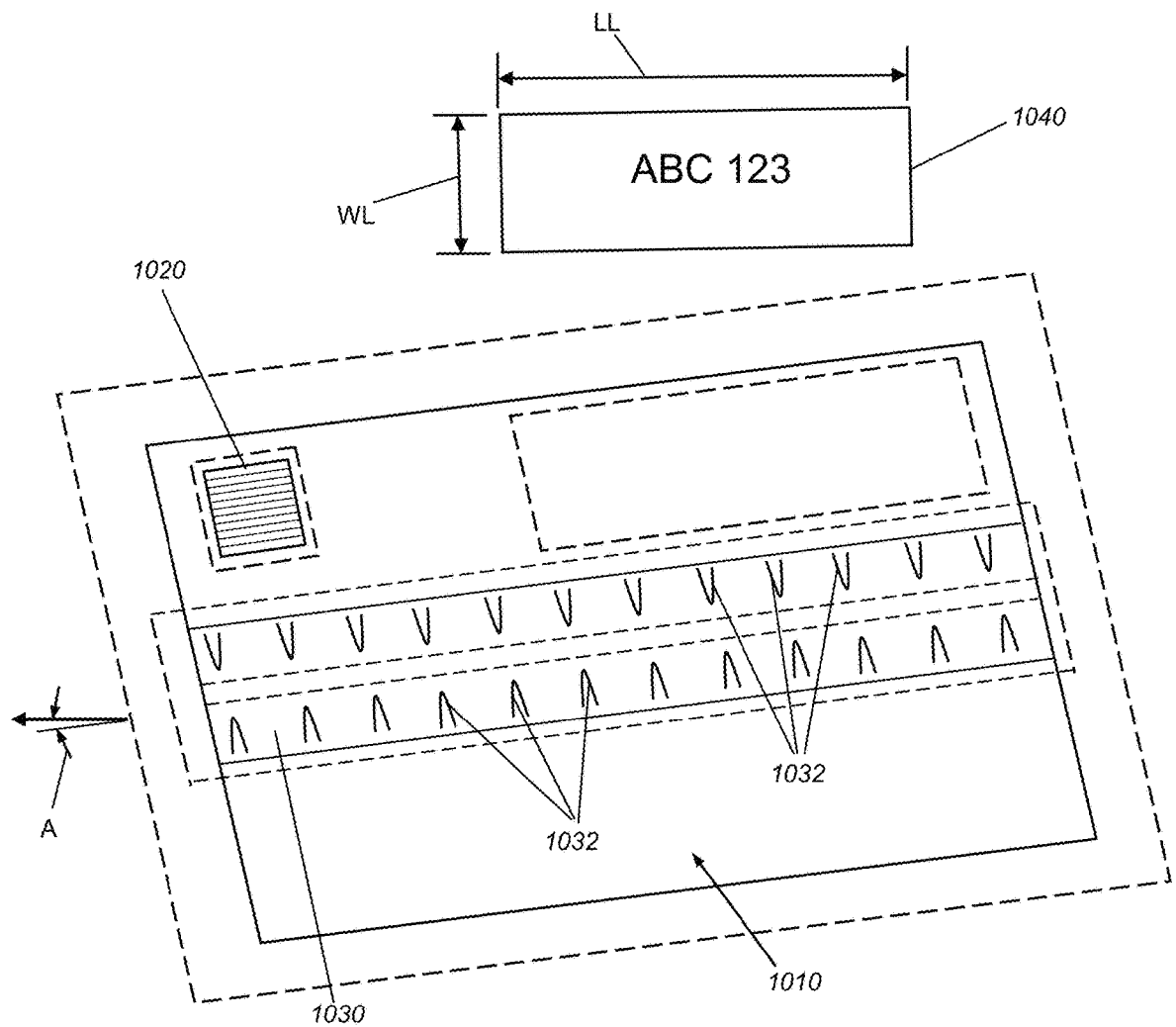
FIG. 10 is a diagram of an acquired 3D range image of an exemplary object surface containing irregularities for which a location suitable to apply a label or other item to the surface is to be determined according to an illustrative system and method.

A particular problem for which 3D vision systems described above (i.e. laser profiling systems) can be employed relates to the location and placement of labels, printing and/or other enhancements on an object surface that contains irregularities. In one example, the surface comprises a side of a box, carton or container that can include tape or other applied items that create a rough surface and/or define exclusionary regions to which no further printing or labels should be applied. Reference is made to FIG. 10, which shows a typical object surface 1010 containing regions with surface irregularities and exclusionary zones. By way of example, the surface 1010 defines a typical box surface to which a label 1040 with predetermined dimensions (e.g. length LL and width WL) should be applied. It is desirable that the label 1040 be placed to avoid a shipping barcode (or other information) 1020 that should be visible during various stages of the shipping and/or logistics process. It is also desirable that the label be placed to avoid overlap onto a sealing tape strip 1030, which can include an irregular surface with wrinkles and troughs 1032. That is, the label may not adhere properly to this region, and/or will appear sloppily placed. Stated in the alternative, it is desired that the label be placed in a region that is relatively smooth and generally free of 3D surface irregularities.

In order to allow automated placement of the exemplary label 1040 onto the box surface 1010 in a rapid and reliable manner, where the box surface can vary in size, shape and layout, making predictable placement of a label challenging for the system. Likewise, the box can be presented to the system in a range of orientations and/or tilt angles, which also renders positioning of the label challenging. As shown in FIG. 10, the box surface 1010 is angled at angle A with respect to the direction of line motion along, for example, a conveyor.

Figure 11:
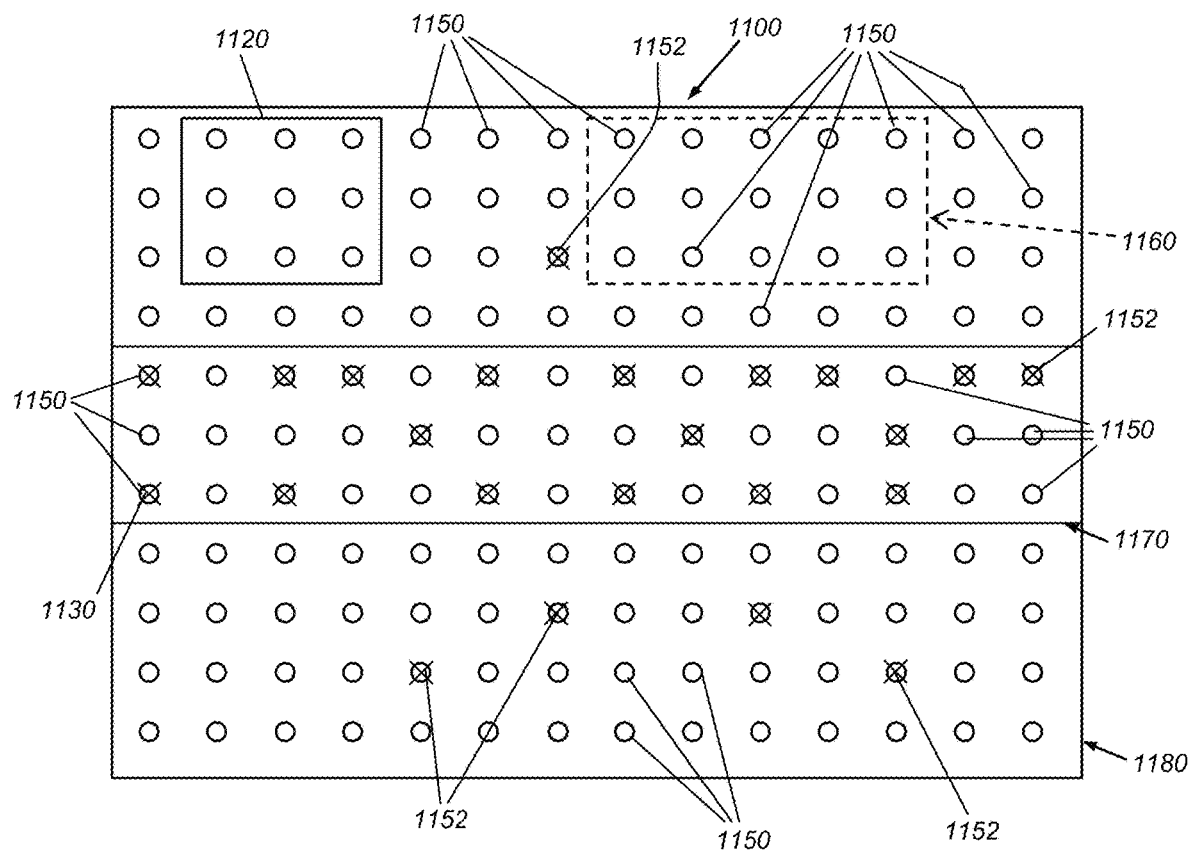
FIG. 11 is a diagram of the acquired image of FIG. 10 in which surface regions thereon are derived into a grid with binary values representing flat or irregular surface features, respectively.

Reference is now made to FIG. 11, which shows an acquired 3D image 1100 of the box surface 1010. The image 1100 includes the barcode feature 1120 and the tape strip feature 1130, which each represent exclusionary regions for placement of the label 1040. Briefly, the system and method determines a series of grid locations 1150 within the overall image, once the surface has been located. These grid locations can be regularly spaced as shown or irregularly spaced—for example, oriented relative to known regions of interest on the surface. The nature of the 3D features at each grid location is determined. Those grid locations with surface irregularities, (e.g. bumps or dips that exceed a predetermined height/depth threshold) are flagged as shown by the applied X marks (e.g. grid locations 1152). As described below, the grid forms the basis of the decision-making process on whether a given region is appropriate to accommodate a label or other embellishment—or if no region is available on the surface to accommodate the item.

Figure 12:
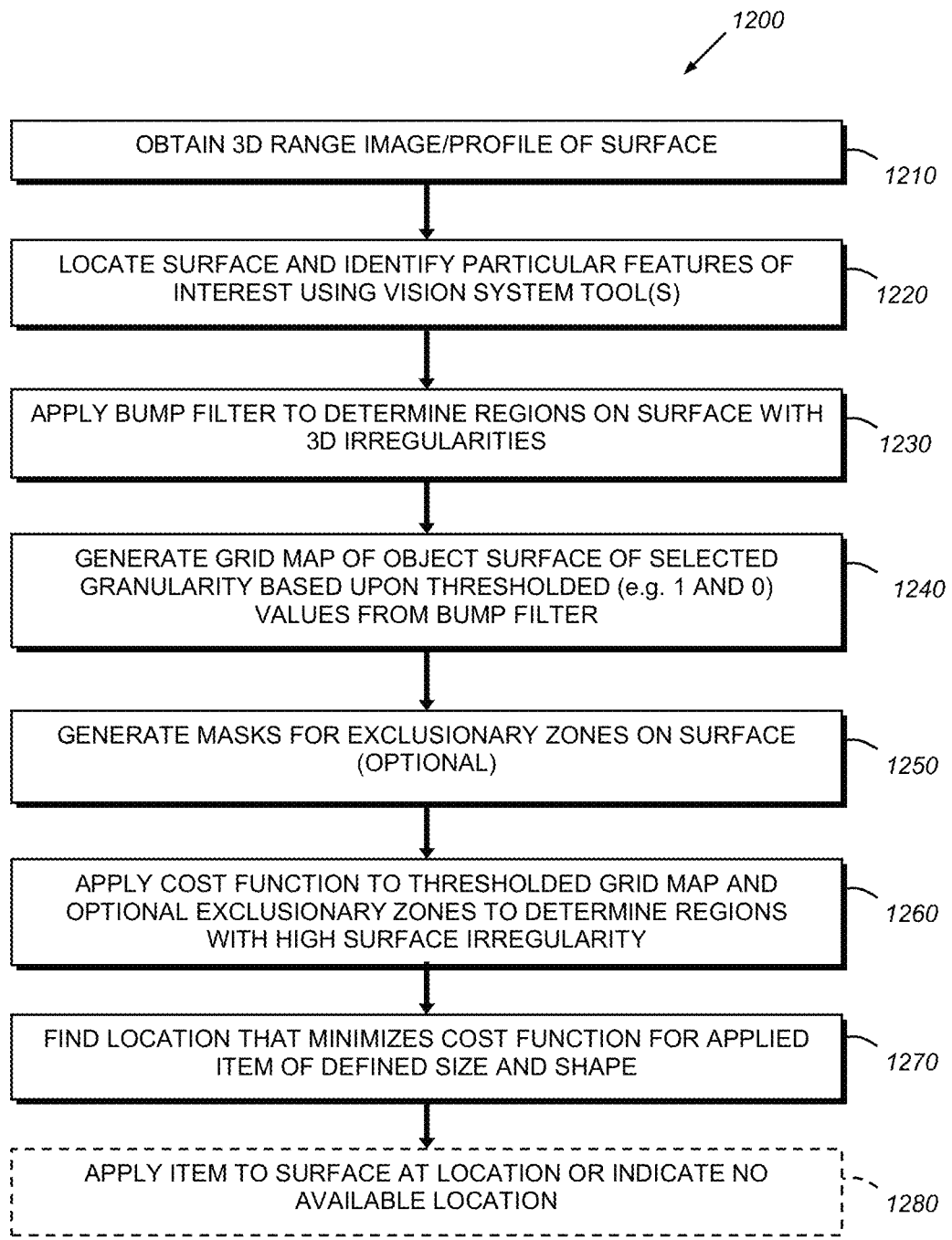
FIG. 12 is a flow diagram of an illustrative process for determining presence of one or more suitable locations/regions with sufficient flatness or surface regularity to apply an item, such as a label.

With further reference to FIG. 12, a location process 1200 is shown and described in further detail. In step 1210, the process 1200 (typically carried out by the vision system processor 180 (FIG. 1) using the location determination process 191) acquires a 3D range image (i.e. a profile) of a surface on an object of interest using any appropriate 3D imaging device including, but not limited to, the vision system arrangement 100 in FIG. 1. The object can be passed through the vision system arrangement and tracked using, for example, an encoder that measures travel of a conveyer that transports the object through the imaged scene. The 3D pixel data acquired by the vision system camera is used to provide an image data set for use in various follow-on vision system processes. Illustratively, in step 1220, the acquired image is used (for example in 2D) to locate the edges and corners (if applicable) of the surface, and/or any features of interest (e.g. seams, labels, barcodes, fiducials, etc.) on the surface. A variety of conventional and/or custom vision system tools can be used in this step—for example, edge finders, blob tools, contrast tools, and other tools and applications that are clear to those of ordinary skill (e.g. tools/applications available from Cognex Corporation of Natick, Mass.).

In process step 1230, the above-described bump filter operates on the image data set to determine locations/regions of surface irregularities (i.e. 3D bumps and dips) on the surface image. Then in step 1240, the process 1200 generates a grid map with a predetermined granularity (which can be defined finer or coarser based upon the user's needs) across some or all of the surface image. An exemplary grid is shown by elements 1150 in FIG. 11. The grid is thresholded, based upon system-based parameters, or user-based parameters (using, for example an appropriate graphical user interface (not shown)). The thresholding can create a binary (1-bit) pattern of 1s and 0s that are values based upon whether a particular grid element contains a surface irregularity of sufficient magnitude (e.g. z-axis height and/or x-y-axis size) to meet the minimum threshold for a surface irregularity that is considered problematic by the system in the application of a label. As described above, the spacing and layout of the grid can be regular in the x and y-axis directions or it can be arranged according to another pattern of either regular or irregular spacing. For example, the spacing along the x-axis direction can be less than that along the y-axis direction. Also, certain regions of the image can specify closer grid spacing in either (or both) direction(s) than other regions—for example where region is crowded with small features that should be avoided.

In step 1250, which can be optional, the system can generate masks within the grid representative of exclusionary zones (i.e. forbidden zones) around regions of the image that contain certain features that should not be covered with labels or other items. For example, region 1120 in the image of FIG. 11 includes a barcode that should be left uncovered and clearly exposed on the exemplary package. These exclusionary zones can be predefined where the feature is in a known and predictable location on the package. Alternatively, the exclusionary zone can be defined using a vision system tool—for example, an ID code-finding tool. The size of the exclusionary zone is sufficient to ensure that the feature remains unaffected by the application of a label or other item. Note that exclusionary zones can also be defined based upon locations on the image where further process will occur—such as application of additional labels, postage, stamping, etc. Such locations are predefined (pre-trained) in the process, and are typically not generated based upon the determination of a feature in the image.

In step 1260, the process 1200 applies a cost function to the thresholded grid on an iterative basis. This cost function computes regions with a high value due to surface irregularity (and/or optionally exclusionary zones due to printing, etc.). In generating such values, the process 1200 counts the number of 1s (e.g. grid elements shown with an X in FIG. 11 (1152)) versus 0s (1150) for each grid location in the image over the range of the label dimensions (e.g. x and y length and width). In step 1270, the process then locates the region where the total value is minimized (e.g. a global minimum with the least number of Xs). As shown in the example of FIG. 11, the region 1170 of the tape strip is dense with high value grid elements (Xs). Likewise, the bottom area 1180 of the image contains several high value grid elements. Conversely, the right top of the image 1100 is relatively irregularity-free (i.e. the flattest print-free region) and therefore provides a desirable location form applying the exemplary label as shown by the dashed box 1160.

Figure 12A:
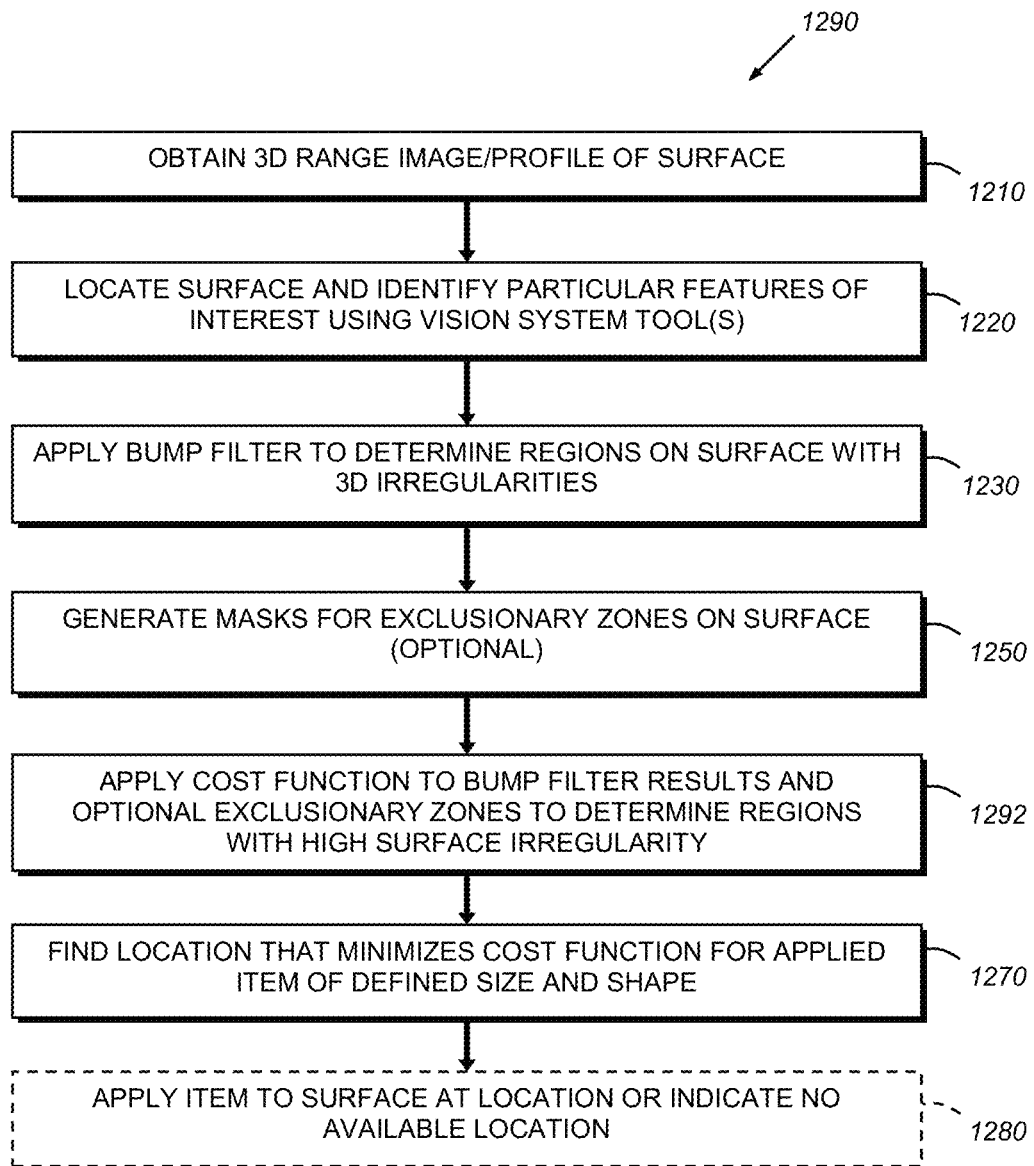
FIG. 12A is a flow diagram of an alternate process for determining the presence of one or more suitable locations/regions with sufficient flatness or surface regularity to apply an item, using bump filter results to construct a cost function.

Note that the cost function shown and described herein is illustrative of a wide range of techniques, mechanisms and/or approaches to mapping the image. Alternatively, the cost function can be constructed directly on the results of the bump filter from step 1230. As such, the modified flow diagram shown in FIG. 12A applies. Note that similar steps to those shown and described for FIG. 12 are provided with like reference numbers, and the above description thereof applies. In particular, step 1240 is omitted from FIG. 12A and the bump filter in step 1230 generates regions with surface irregularity that directly indicate locations in which a bump or dip resides on the overall surface. The locations are processed in step 1292 to generate a cost function free of any grid map. That is, the cost function uses height (and coverage area) information for bumps and dips to determine whether a particular region is suitable for the item/label to-be-applied to the surface. The optional exclusionary zones can also be processed in step 1292 to exclude regions where a label or other forbidden feature resides Once the optimal location for label (or other item) application is determined in either FIG. 12 or 12A, the process can trigger other devices or systems to apply the label/item in step 1280 (shown in phantom) to that location. This can entail servoing a robot manipulator and/or a motion stage containing the object so that the label/item is applied to the desired location on the surface. Alternatively, step 1280 can indicate that no suitable location exists to apply a label or other item to the surface due to excess irregularity or size constraints of the available flat surface. Where no suitable location is available, the object can be flagged by an alarm and/or rerouted from the conveyor line (for example) to a special handling location.

It is expressly contemplated that the user interface or other programming mechanism can be used to adjust the sensitivity of the process by altering or tuning the bump filter masks to identify irregularities (non-flat features) of a certain height and/or size. The grid density/granularity can also be adjusted to change the overall sensitivity of the process.

Figure 13:
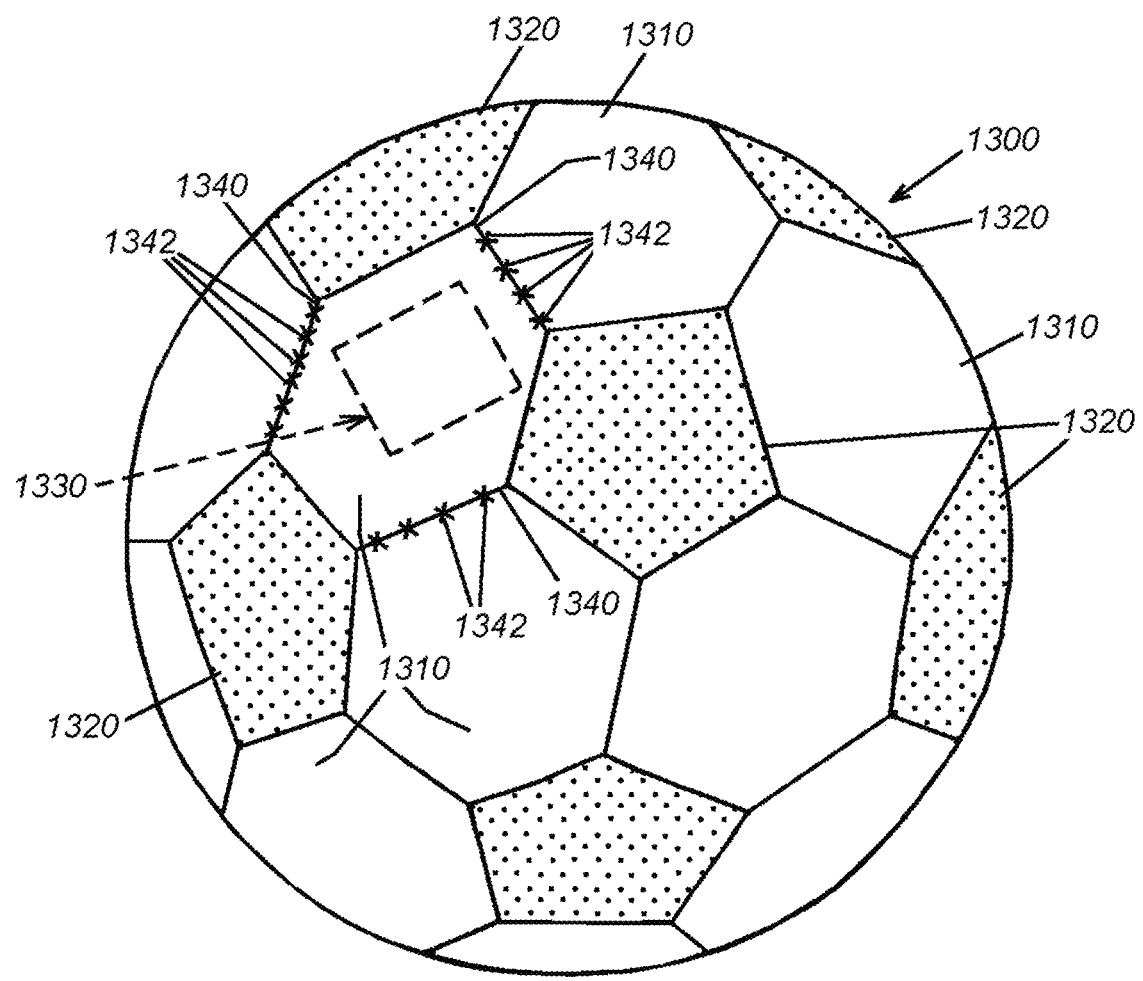
FIG. 13 is a diagram of an exemplary ball having a spherical surface with irregularities and exclusionary zones, showing an application for the system and method for determining suitable locations to apply labels and/or other items to the surface.

With reference to the object 1300 of FIG. 13 (e.g. a soccer ball with alternating white and black pentagonal shapes 1310 and 1320, respectively) the process 1200 has the ability to accommodate low-frequency variation of the surface, such bas the continuous curvature of the spherical ball. The process 1200 can identify an appropriate location (dashed box 1330) for an applied item, while locating ridges 1340 (denoted by grid Xs) that should be avoided. The black pentagons 1320 can also be avoided as locations for the item by establishing exclusionary zones as described above in step 1250. The illustrative process 1200 effectively locates surfaces with low irregularity even on a sloped or curved surface, such as the depicted ball. Conversely other algorithms, such as a conventional fit plane algorithm, would generally fail on the surface of the depicted ball.

The system and method is also advantageous over an alternative technique in which a plane is fit to a specific area and then this area is grown as long as plane's fit quality remains acceptable (up to a size that occupies the label). In such an alternative technique, the processing overhead required is often substantially greater as the system iterates through successive area-growth operations.

Figure 9:
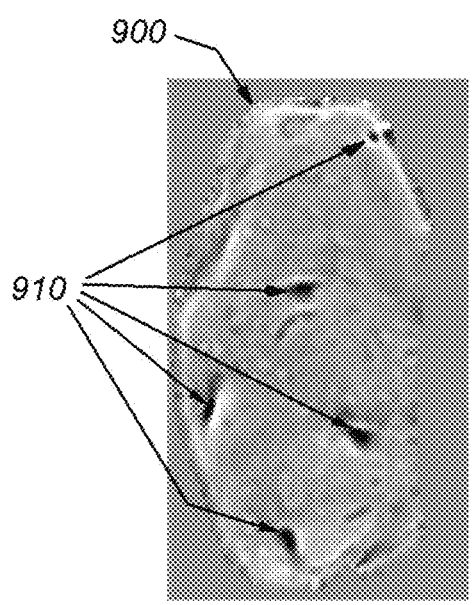
FIG. 9 is a height variation image based upon of the exemplary range image of FIG. 2, based upon the illustrative filtering process of FIG. 3 wherein bump features are clearly resolved for application of appropriate analysis tools by the vision system.

Referring again to the exemplary range image 200 of FIG. 2, subsequent to application of the filtering process of FIG. 3, the height deviation image can be represented by the diagram of FIG. 9. The object 900 is shown with a series of resolved spots 910 that clearly differentiate the height deviating features (bumps) from the surrounding surface (due to their depicted sharp contrast with the surroundings). As such, the vision system can direct further analysis specifically to these highlighted regions with greater accuracy and efficiency.

Thus, it should be clear that the illustrative surface normal bump filter described above is particularly desirable for use in analyzing objects having non-flat, but smooth surfaces, with local dents and bumps. For a simple surface such as a plane with dents, the illustrative bump filter would give comparable results as those obtained by fitting a single plane, then measuring the distance of each point (pixel) on the surface from the fit plane. However, because the bump filter estimates local planes, it is able to accommodate a wide range of non-flat surfaces with variable and a priori unknown surface geometry. Notably, because the illustrative bump filter measures distance normal to the surface, it produces nearly identical height estimates at corresponding points even when a 3D object is rotated in depth and reimaged with a range sensor. This invariance greatly simplifies subsequent processing/analysis of the bump height image in order to detect surface defects by various vision system tools.

It is expressly contemplated that particular enhancements to the above-described process(es) can be employed in other applications. Illustratively, the process can employ the residual error of the plane fit to qualify the height measurement. Where an annulus is (for example) used for the background and a patch in the foreground for the height, the process can both respond to the (bump) feature being sought and also can respond all along a particular linear feature (e.g. a ridge). The plane fit can exhibit high residual fit error at the points where the annulus is centered on the ridge, and that response can be used to reject the height measurements at those points.

In the determination of sufficiently flat and/or regular surfaces for application of labels or other items, the foregoing embodiment provides an efficient and variable system and method. This system and method operates on surfaces with both high-frequency and low-frequency surface variation, and effectively determines appropriate locations for application of items. These items can include applied labels, printing, etching, decals, and/or any other appropriate embellishments to the surface that desirably reside within a relatively regular region. Likewise the underlying surface can be flat, curved or partially flat and partially curved. A variety of soft and/or hard surface materials and/or finishes are also contemplated including specular, opaque, translucent, transparent and combinations thereof. Moreover, through use of masks and/or exclusionary zones, creases or other known irregularities can be overlooked in determining a location for item application. In such a manner an item can be placed across a crease, fold, crown edge or other known feature.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity. Also, height (z-axis) accuracy can be improved by setting camera assembly exposure so that detected features in the image remain unsaturated. More particularly, the range image generated herein can be provided by a variety of 3D imaging systems including, but not limited to a LIDAR-equipped camera, a stereoscopic camera assembly, or combinations of such arrangements. As described generally above, the foreground and background regions can be specified with any size and shape that meets the requirements of a given application. Also since, the most processing-intensive aspect of the surface normal bump filter is typically the local plane-fitting operation, this task can be expedited by recursively updating the plane-fit regression matrix as the background region is slid across the image. Also as noted above, the local plane fitting operation can avoid use of all points in the background region—and instead can employ a robust plane-fitting procedure (e.g. RANSAC) to exclude outlier points from the fit. Illustratively, invariance of measurements to the object surface orientation can also be further improved by varying the shape of background and foreground regions according to the local surface normal direction. This would allow presentation of foreground and background regions whose shape is constant in the surface coordinates of the 3D object (rather than being constant in the x-y space of the range image). Accordingly, this description is meant to be taken only by way of example, and not to otherwise limit the scope of this invention.

What is claimed is:

1. A system for determining surface height variations on an object based upon a range image comprising;
    a camera assembly that generates a range image;
    a vision system that analyzes the range image;
    a filter that (a) generates a best-fit surface about each of selected pixels in the range image, each of the selected pixels in the range image defining a height of the object, (b) establishes a normal to the best-fit surface, respectively for each of the pixels, and (c) determines a relative height displacement of a region about each of the pixels relative to the best-fit surface; and
    a vision system tool that analyzes height displaced features localized by the filter.

2. The system as set forth in claim 1 wherein the filter includes a background region about each of the selected pixels from which the best-fit surface is established.

3. The system as set forth in claim 2 wherein the filter includes a foreground region, located proximate to the background region and including at least one of the selected pixels in which the relative height displacement is determined.

4. The system as set forth in claim 3 wherein at least one of a size and a shape of at least one of the background region and the foreground region is user-defined based upon at least one of a size and a shape of the object.

5. The system as set forth in 1 wherein the camera assembly comprises a displacement sensor that projects a line of light on the object and receives light from the projected line at an imager in a manner that defines a plurality of displacement values in a height direction.

6. The system as set forth in claim 1 wherein the best-fit surface comprises a best-fit plane.

7. A method for determining surface height variations on an object based upon a range image comprising the steps of:
    (a) generating a best-fit surface about each of selected pixels in the range image, each of the selected pixels in the range image defining a height of the object;
    (b) establishing a normal to the best-fit surface, respectively for each of the pixels;
    (c) determining a relative height displacement of a region about each of the pixels relative to the best-fit surface; and
    (d) analyzing, with a vision system tool, localized height displaced features.

8. The system as set forth in claim 1 wherein the best-fit surface defines a surface of average height about each of the selected pixels in the range image.

9. The method as set forth in claim 7 wherein the step of generating includes generating a best-fit surface of average height about each of the selected pixels in the range image.

10. The system as set forth in claim 1, wherein the range image comprises a single range image or a plurality of range images.

11. A system for determining surface height variations on an object based upon a range image comprising,
    a camera assembly that generates a range image;
    a vision system that analyzes the range image;
    a filter that (a) generates a plurality of best-fit planes each corresponding to each of selected pixels in the range image, each of the selected pixels in the range image defining a height of the object, (b) establishes a plurality of surface normals in a surface normal direction relative to the best-fit planes, respectively for each of the pixels, and (c) determines a relative height displacement in the surface normal direction of a region about each of the pixels relative to the best-fit plane representing a distance from the best-fit plane to each of the pixels; and
    a vision system tool that analyzes height displaced features localized by the filter.

* * * * *